United States Patent [19]

Deubler

[11] 4,273,570
[45] Jun. 16, 1981

[54] PROCESS FOR THE PRODUCTION OF A LIQUID ALKALINE FERTILIZER CONTAINING CLAYS AND TRACE ELEMENTS

[76] Inventor: Josef Deubler, Ramsau Nr. 31, 4822 Bad Goisern, Austria

[21] Appl. No.: 77,828

[22] Filed: Sep. 21, 1979

[30] Foreign Application Priority Data

Mar. 30, 1978 [AT] Austria ................................ 2258/78

[51] Int. Cl.³ .............................................. C05D 3/00
[52] U.S. Cl. .......................................... 71/21; 71/54; 71/61; 71/62; 71/63; 71/64 C
[58] Field of Search ....................... 71/62, 61, 64 C, 1, 71/11, 63, 31, 54, 21, 22

[56] References Cited

U.S. PATENT DOCUMENTS

| 3,096,170 | 7/1963 | Newsom | 71/64 C |
|---|---|---|---|
| 4,033,747 | 7/1977 | Young | 71/64 C X |
| 4,070,175 | 1/1978 | Swanson et al. | 71/22 X |
| 4,089,669 | 5/1978 | Sawyer | 71/64 C X |

FOREIGN PATENT DOCUMENTS

| 416034 | 7/1974 | U.S.S.R. | 71/21 |
|---|---|---|---|
| 509570 | 6/1976 | U.S.S.R. | 71/31 |

Primary Examiner—William F. Smith
Attorney, Agent, or Firm—Martin A. Farber

[57] ABSTRACT

Method for the production of a liquid fertilizer and respectively fertilizer concentrate, starting from an aqueous suspension and solution, respectively, of Haselgebirge and respectively or Werklaist, by addition of calcium carbide with stirring.

17 Claims, No Drawings

PROCESS FOR THE PRODUCTION OF A LIQUID ALKALINE FERTILIZER CONTAINING CLAYS AND TRACE ELEMENTS

The invention relates to a process for the production of a liquid, alkaline fertilizer containing clays and trace elements.

In the fertilization of cultivated plants it is not only necessary to supply these with nitrogen, but these must also be supplied with the necessary mineral substances and trace elements. Therefore already numerous fertilizers have been suggested which are intended to take this condition into account. As examples the following publications can be pointed out: German OS No. 2 235 773, German As No. 1 024 101, French Pat. No. 1 214 294, Swiss Pat. No. 305 731 and German Pat. No. 686 912.

The invention is based on the task of setting forth a process for the production of a fertilizer of the introductory described type with which a problemless and complete fertilization of cultivated plants is possible and which starts out from cheap raw materials.

The invention starts out from the recognition that Haselgebirge, that is a brecciated mixture of clay, salt and calcium sulphate or gypsum, as it occurs above all in the Salzkammergut and in the Berchtesgaden Alps, and the residue (Werklaist) which accumulates or collects after the brine-leaching contain the mineral substances and trace elements necessary for the fertilization. However, the Haselgebirge and the Werklaist are not useable as fertilizer without pretreatment or preliminary treatment.

The invention solves its underlying task to state a process for the production of a fertilizer of the introductory mentioned type in the manner that 30-40 parts by weight of ground Haselgebirge is added to 70-60 parts by weight of water and this mixture for the production of a solution and suspension, respectively, is stirred or agitated for at least 30 minutes, that with continued stirring in the watery mixture per 1000 liters of mixture, 0.1 to 0.5 kg. of calcium carbide is added, that after gas generation has ended, stirring still continues at least one hour and that the alkaline fertilizer concentrate thus obtained, before use if necessary under the circumstances is diluted with water.

With the process according to the invention a compound or complete fertilizer is obtained with fulfills all demands. By means of the treatment with calcium carbide the solid particles (essentially saliferous clays) which are suspended in the fertilizer, upon depositing or sedimentation are prevented from sticking or caking together, as is the case when the treatment according to the invention is not undertaken.

The fertitlizer produced according to the invention can be used for all types of fertilization, it is particularly suited, however, for the spring fertilization in March, April and May as well as for the summer fertilization in July and August. The type and amount of nitrogen admixture depends on the plants to be fertilized. Since as a rule 50 to 80, preferably 60 to 70 liters concentrate per hectare of area to be fertilized come into use after corresponding thinning or dilution, and this corresponds to a quantity of 0.2 to 0.5 g common salt per m$^2$ of fertilized area, no dangers whatsoever exist that even with repeated fertilization too much salt is supplied to the soil, which would be harmful (cf. "Lehrbuch der Bodenkunde" ("Textbook of Soil Science")-Scheffer-Schatschabel-9th edition 1976, pages 261-262 and 266-267). In the previously attempted tests and also with the practical application of the fertilizer produced according to the invention, no harm or damages could be determined either by its sodium chloride content or by the clays contained in the fertilizer. Rather, for example, with the meadow fertilization after use of the fertilizer produced according to the invention, it was observed that the growth of the rank weeds was inhibited and that of the graminaceous plants was furthered. Simultaneously an improvement of the soil was observed. In this connection it should also be pointed out that disadvantageous consequences of a repeated use of the fertilizer does not occur for the reason, too, that not simply does a suspension or slurry of Haselgebirge in water come to be used, but rather that this suspension is treated in the manner according to the invention.

Analyses of two tests of Haselgebirge (bore dust or borings from drillings in the salt mine near Hallstatt) are given below:

Test 1:
H$_2$O soluble portion (10 g sample per 500 ml distilled H$_2$O) approximately 63% comprising:

|  | % |  | % |
|---|---|---|---|
| Ca$^{++}$ | 3.778 | CaSO$_4$ | 12.833 |
| Mg$^{++}$ | 0.244 | MgCl$_2$ | 0.957 |
| SO$_4^{--}$ | 9.477 | Na$_2$SO$_4$ | 0.623 |
| Cl$^-$ | 52.455 | NaCl | 84.725 |
| K$^+$ | 0.386 | KCl | 0.736 |

H$_2$O insoluble portion (10 g sample per 500 ml distilled H$_2$O) approximately 37% comprising:

|  | % |
|---|---|
| CaO | 0.350 |
| MgO | 9.325 |
| SO$_3$ | 0.729 |
| K$_2$O | 12.494 |
| SiO$_2$ | 49.740 |
| Sesquioxide | 27.215 |

Test 2:
H$_2$O soluble portion (10 g sample per 500 ml distilled H$_2$O) approximately 33% comprising:

|  | % |  | % |
|---|---|---|---|
| Ca$^{++}$ | 5.602 | CaSO$_4$ | 19.028 |
| Mg$^{++}$ | 1.279 | MgCl$_2$ | 5.009 |
| SO$_4^{--}$ | 15.101 | Na$_2$SO$_4$ | 2.476 |
| Cl$^-$ | 48.039 | NaCl | 72.181 |
| K$^+$ | 0.580 | KCl | 1.106 |

H$_2$O insoluble portion (10 g sample per 500 ml distilled H$_2$O) approximately 67% comprising:

|  | % |
|---|---|
| CaO | 0,736 |
| MgO | 7,939 |
| SO$_3$ | 0,986 |
| K$_2$O | 10,918 |
| SiO$_2$ | 51,160 |
| Sesquioxide | 27,810 |

The average composition (mean values from 14 analyses with alkali-determination) of the alpine saliferous clays contained in the Haselgebirge can be gathered from the following Table I.

TABLE I

| Designation of rock | Group of the black saliferous clays | | | Group of the green to gray saliferous clays | | | |
|---|---|---|---|---|---|---|---|
| | black anhydrite | black Saliferous Clay | greenish-black | green | gray-green | gray saliferous clay Hall in Tyrol | Hallein |
| Al₂O₃ | 15.80 | 17.50 | 18.85 | 20.21 | 22.20 | 16.75 | 19.80 |
| SiO₂ | 45.24 | 43.20 | 46.00 | 49.20 | 50.34 | 61.65 | 52.86 |
| MgO + CaO | 16.28 | 15.60 | 12.16 | 10.80 | 9.36 | 7.82 | 10.10 |
| (KNa)O | 3.12 | 4.48 | 5.19 | 4.01 | 4.41 | 3.14 | 4.04 |
| Fe₂O₃ + FeO | 5.60 | 7.00 | 7.20 | 7.33 | 8.53 | 5.81 | 5.96 |
| % amount | 86.04 | 87.78 | 89.40 | 91.55 | 94.84 | 95.17 | 93.36 |
| mineral constitutents (mean values) | | | | | | | |
| aluminal (or argillaceous earth)-alkali-silicate | 42.36 | 49.01 | 56.64 | 60.60 | 60.73 | 47.93 | 55.94 |
| Mg hydrosilicate | 16.70 | 17.80 | 17.49 | 16.70 | 17.65 | 14.98 | 18.50 |
| Quartz | 14.98 | 9.62 | 7.77 | 8.29 | 10.39 | 29.12 | 14.01 |
| Anhydrite | 16.16 | 4.82 | 1.94 | 1.28 | 0.94 | 1.24 | 1.36 |
| calcite | — | — | — | — | 0.75 | 0.92 | — |
| dolomite | — | 0.82 | 0.29 | 0.40 | — | — | — |
| magnesite | 4.20 | 10.93 | 7.06 | 5.17 | 0.95 | — | 3.62 |
| amount of the fe-oxide and secondary ingreients | 5.60 | 7.00 | 8.81 | 7.56 | 8.69 | 5.81 | 6.57 |
| % amount | 100.00 | 100.00 | 100.00 | 100.00 | 100.13 | | |
| specific weight | 2.77 | 2.75 | 2.74 | 2.73 | 2.77 | 2.78 | 2.75 |

Haselgebirge whose sodium chloride content is at the most 20, preferably at the most 18%, is introduced with advantage in the process according to the invention. It has proven particularly advantageous if the sodium chloride content is at 15%.

In case the sodium chloride content present in the existing Haselgebirge is too high, the possibility exists of putting in a Haselgebirge mixed with Werklaist. Werklaist is the remaining residue in the extraction or obtaining of common salt and for example has the analysis given in Table II of a Laist from the Rotsalzgebirge (red salt mountains) of Hallstatt.

TABLE II

| Water soluble | 6.73% | thereof NaCl 3.70%* |
|---|---|---|
| insoluble in water | 93.27% | (separ. at 120° C.) |
| specific weight | 2.67% | |
| SiO₂ | 49.72% | |
| Al₂O₃ | 20.50% | |
| Fe₂O₃ | 8.00% | |
| CaO | 0.91% | |
| MgO | 10.59% | |
| K₂O } Na₂O | 4.50% | |
| CO₂ | 1.19% | |
| SO₃ | 0.74% | |
| H₂O | 3.84% | |

*can rise up to 15% (at 18% water-soluble)

The chemical composition of Werklaist corresponds to the chemical composition of the alpine saliferous clays as they are given in the following Table III.

TABLE III

| Chemical composition of alpine saliferous clays (in limits) | | |
|---|---|---|
| | Illit | Alpine saliferous clay |
| SiO₂ | 44–52,2% | 42,5–53% |
| Al₂O₃ | 21,5–32,8% | 17,4–23% |

TABLE III-continued

| Chemical composition of alpine saliferous clays (in limits) | | |
|---|---|---|
| | Illit | Alpine saliferous clay |
| Fe₂O₃ } FeO | 2,3–6,2% | 5,6–8% |
| MgO | 1,3–3,9% | 8,0–13,5% |
| CaO | 0,0–0,9% | 0,3–2,3% |
| Na₂O | 0,1–0,9% | 0,1–2,5% |
| K₂O | 4,8–7,7% | 2,8–5,1% |
| MnO | 0–0,1% | |
| TiO₂ | 0–0,7% | |
| H₂O | 8,5% | 1,8–5,8% |

As already mentioned, the addition of nitrogen suppliers to the alkaline fertilizer concentrate (pH-value between 8 and 12) depends on the purpose for which the fertilizer is used. As a rule, however, the procedure is such that the alkaline fertilizer concentrate is mixed with 20 to 70% by weight nitrogen suppliers.

A particularly advantageous variant of the process comprises that the alkaline fertilizer concentrate is mixed with a natural nitrogen supplier by adding it to the washing water for the flushing out of manure from stables. In this manner the liquid manure which in modern animal husbandry or livestock breeding accumulates without strewings as straw, sawdust, leaves, etc., which liquid manure is too rich in nitrogen for immediate use, for example, in grassland forming, can be used for fertilization without danger. A known disadvantage of the use of liquid manure is the annoying smell connected with it, which often lasts for days when no rain comes. With the process according to the invention the annoying smell can be quite considerably reduced.

It is advantageous to proceed such that respectively each 10 liters of flushing water is mixed or treated with 0.25–1.0 liters preferably 0.5 liters of alkaline fertilizer concentrate.

The fertilizer concentrate mixed with the nitrogen supplier can further be diluted with water, whereby according to the invention it can be provided such that respectively each 100 to 150 liters fertilizer concentrate which is mixed with nitrogen suppliers is diluted with 500 to 1500, preferably with 1000 liters of water. This actual degree of dilution depends on the weather and the plants, whereby as a general rule with dry weather a dilution of 80% is to be chosen and with rain a dilution of approximately 70% is to be chosen. The possibility also exists to distribute the diluted, ready to be used fertilizer with a sprinkler or spray-line system right away.

A further advantage of the liquid fertilizer produced according to the invention resides in that, even with intensive dosages, one does not have to wait for precipitates as is the case with the previously known grainy types of fertilizer.

The starting products introduced in the process according to the invention are available in large quantities. In particular, Werklaist was until now a non-utilized waste produce which can be brought to a meaningful use by the process according to the invention.

The fertilizer produced according to the invention can be used for the fertilization of all plants. It has proven itself as particularly valuable with vegetables, salads, carrots, cucumbers, tomatoes, as well as with types of fruit, berries and grape vines. Equally sugar beets can be fertilized with good success with the fertilizer produced according to the invention. Potatoes too can be fertilized particularly successfully with the fertilizer made according to the invention.

Below an example for the process according to the invention and examples for the use of the produced fertilizer are given.

35 kg Haselgebirge with a sodium chloride content of 20% were ground fine (grain size approximately 1-2 mm). The chemical analysis of the introduced Haselgebirge, except for the sodium chloride content, corresponds to the values named in Table II. The ground Haselgebirge was added to 65 liters of water and stirred or agitated for 30 minutes. A liquid results which is gray because of the suspended or slurried saliferous clays.

Into the suspension and solutions respectively thus obtained, 0.35 kg calcium carbide are introduced, while continuously stirring or agitating. After completion of the addition of calcium carbide the stirring continues for one and one half hours. The solution and suspension, respectively, then has a pH value 11.

The thus obtained fertilizer concentrate was additionally processed for the production of a fertilizer for grassland (i.e., for fertilization of meadows) as follows:

Respectively each 1000 liters of wash water for the flushing of manure from stables were added to 20 liters of fertilizer concentrate. The fertilizer thus mixed with liquid manure, and ready to be used, has a light- to gold-yellow color, whereby a sediment or deposit of solids, which deposit might possibly form, even after prolonged standing can be distributed homogeneously again in the solution by simple shaking.

The following are examples of application of the fertilizer produced (without diluting):

(a) 1000 liters of thinly liquid manure were mixed with 8 liters of concentrate. With these 1008 liters of fertilizer means, 1500 $m^2$ of meadowland were fertilized from an autoclave for each hectare, 6720 liters of fertilizer means, and respectively 53 liters of concentrate were used).

(b) 1000 liters of thinly liquid manure were mixed with 10 liters concentrate. With these 1010 liters of fertilizer means, 1600 $m^2$ meadowland were fertilized from an autoclave (for each hectare, 6321 liters of fertilizer means, and respectively 63 liters of concentrate were used).

(c) 1000 liters of viscous liquid manure were mixed with 10 liters of concentrate. With these 1010 liters of fertilizer means 1500 $m^2$ of meadowland were fertilized from an autoclave (for each hectare 6730 liters of fertilizer means, and respectively 80 liters of concentrate were used).

(d) 1000 liters viscous liquid manure were mixed with 12 liters of concentrate. With these 1012 liters of fertilizer means 1500 $m^2$ of meadowland were fertilized from an autoclave (for each hectare, 6747 liters of fertilizer means, and respectively 80 liters of concentrate were used).

Below the results of a comparative fertilization of meadowland are rendered:

Two adjacent meadow sections A and B were fertilized for two years each respectively in the spring and in the Fall, in which process liquid manure (from a cattle stable) out of the same container was used. Before the fertilization of the meadow section A, an additional 10 liters of the alkaline fertilizer concentrate produced according to the example were added to each 1000 liters of the liquid manure. After the spring fertilization in the third year, the growth conditions were determined in June by the agricultural experimental station in Gumpenstein (Austria) by counting of the graminaceous plants in a section of respectively each 100 $m^2$ of both meadows. The results are rendered in Table IV.

TABLE IV

| | Results of the count of the meadow sections (%) | |
|---|---|---|
| | MEADOW A | MEADOW B |
| Height of growth in cm. | 40-90 | 20-70 |
| Area of application in $m^2$ | 100 | 100 |
| Coverage in % | 90-95 | 90-95 |
| GRAMINACEOUS PLANTS | | |
| Holcus lanatus (Wolliges Honiggras) | + | + |
| Trisetum flavescens (Gewohnlicher Goldhafer) | 15-20 | 3-5 |
| Poa trivialis (Gewohnliches Rispengras) | 25-30 | 1-2 |
| Dactylis glomerata (Wiesen-Knauelgras) | 10-15 | 2-3 |
| Avena pratensis (Trift-Hafter) | + | 3 |
| Festuca pratensis (Wiesen-Schlingel) | 2-3 | 2 |
| Anthoxanthum odoratum (Gewohnliches Ruchgras) | +-3 | 3 |
| Arrhenatherum elatius (Franzosisches Raygras) | 1-2 | 3 |
| Festuca rubra (Roter-Schwingel) | + | 2 |
| Phleum pratense (Wiesen-Lieschgras) | 1 | 2 |

TABLE IV-continued

Results of the count of the
meadow sections
(%)

| | MEADOW A | MEADOW B |
|---|---|---|
| Pimpinella major (Große-Bibernelle) | + | + |
| Rumex acetosa (Wiesen-Sauerampfer) | + | 2-3 |
| Heracleum sphondylium (Wiesen-Barenklau (Wuchergras)) | 2 | 15 |
| Rhinantus alectorolophus (Zottg. Klappertopf (Wuchergras)) | + | 30-35 |
| Leontodon hispidus (Rauhes Milchkraut) | 2 | 8 |
| GERANIUM-GROWTHS | | |
| Geranium phaeum (Brauner Storchschnable) | 3 | 5-8 |
| FABACEAE | | |
| Trifolium pratense (Roter Wiesenklee) | 10 | 8 |
| Trifolium repens (Weiß-Klee) | 2 | 2 |
| Medicago lupulina (Hopfenklee) | + | + |
| Lathyrus pratensis s (Wiesen-Platterbse) | + | + |
| APIACEAE | | |
| Anthriscus silvestris (Wiesen-Kerbel (Wuchergras)) | 2 | 25-30 |
| CICHORIACEAE | | |
| Taraxacum officinale (Wiesen-Lowenzahn) | 1 | 2-3 |
| SCROPHULARIACEAE | | |
| Veronica chamaedrys (Gamander Ehrenpreis) | + | + |
| HERBACEOUS PLANTS | | |
| Silene vulgaris (Klatsch-Leimkraut) | + | + |
| Plantago lanceolata (Spitz-Wegerich) | + | + |
| Chrysanthemum leucanthemum (Gewohnl. Margerite) | 1-2 | 1-2 |
| Cerastium holosteoides (Hornkraut) | + | + |
| Crepis mollis (Weichh. Pippau) | + | + |
| Cruciata laevipes (Kreuzlabkraut) | + | + |
| Tragopogon pratensis (Bocksbart) | + | 5 |
| Bellis perennis (Ganseblumchen) | + | + |
| Chaerophyllum hirsutum (Rauher Kalberkopf) | 1-2 | |
| Primula elatior (Große Schlusselblume) | + | + |
| Ranunculus acris (Scharfer Hahnenfuß) | + | 1-2 |
| Aegopodium podagraria (Geißfuß) | + | + |
| Achillea millifolium (Gemeine Schafgarbe) | + | + |

(The symbol + signifies a portion under 1%)

The results combined in Table IV show not only a taller growth in meadow A but also that on the meadow A there were 73% nutritive grasses, 27% clover and lower grasses, but practically no rank weeds, whereas on the meadow B only 21% nutritive grasses and 79 rank weeks grew (of which the chief representatives are named in Table IV).

I claim:

1. Process for the production of a liquid, alkaline fertilizer containing clays and trace elements, comprising the steps of
    adding 30-40 parts by weight of ground Haselgebirge to 70-60 parts by weight of water, and
    stirring or agitating this mixture for the production of a solution and suspension, respectively, for at least 30 minutes,
    with continued stirring adding in the aqueous mixture per 1000 liters of mixture, 0.1 to 0.5 kg. of calcium carbide,
    after gas generation has ended, continuing stirring at least one hour obtaining an alkaline fertilizer concentrate.

2. Method according to claim 1, further comprising the step of
    mixing the fertilizer concentrate with a nitrogen supplier.

3. Method according to claims 1 or 2, wherein the sodium chloride content of the Haselgebirge amounts to at most 20%.

4. Method according to claim 3, wherein the sodium chloride content of the Haselgebirge amounts to 15%.

5. Method according to claim 3 wherein the Haselgebirge is mixed with Werklaist.

6. Method according to claim 2, further comprising the step of
    mixing the alkaline fertilizer concentrate with 20 to 70% by weight of the nitrogen supplier.

7. Method according to claim 1, further comprising the step of
    mixing the alkaline fertilizer concentrate with a natural nitrogen supplier by adding it to washing water for the flushing of dung from stables.

8. Method according to claim 7, wherein 10 liters of the washing water is mixed with each 0.25-1.0 liters of the alkaline fertilizer concentrate.

9. Method according to claim 2, further comprising the step of
    diluting each 100 to 150 liters of the fertilizer concentrate which is mixed with the nitrogen supplier with 500 to 1500 liters of water.

10. Method according to claim 2, wherein 1000 liters of liquid manure is mixed with each 5-15 liters of the alkaline fertilizer concentrate.

11. The method according to claim 1, further comprising
diluting the alkaline fertilizer concentrate with water.

12. The method according to claim 2, wherein
the nitrogen supplier is a synthetic supplier.

13. The method according to claim 2, wherein
the nitrogen supplier is a natural supplier.

14. The method according to claim 1, wherein
the sodium chloride content of the Haselgebirge is at most 18%.

15. The method according to claim 8, wherein
0.5 liters of the alkaline fertilizer concentrate are mixed with every 10 liters of the washing water.

16. The method according to claim 9, wherein
1000 liters of water are mixed with each 100 to 150 liters of the fertilizer concentrate which is mixed with the nitrogen supplier.

17. The method according to claim 2, further comprising the step of
mixing 1000 liters of liquid manure with every 10 liters of the alkaline fertilizer concentrate.

* * * * *